United States Patent [19]

Bütikofer

[11] Patent Number: 5,137,289
[45] Date of Patent: Aug. 11, 1992

[54] CHUCK

[75] Inventor: Willy Bütikofer, Aegerten, Switzerland

[73] Assignee: Fabel Holding AG, Zug, Switzerland

[21] Appl. No.: 613,777

[22] PCT Filed: Mar. 15, 1990

[86] PCT No.: PCT/CH90/00070
§ 371 Date: Nov. 16, 1990
§ 102(e) Date: Nov. 16, 1990

[87] PCT Pub. No.: WO90/10517
PCT Pub. Date: Sep. 20, 1990

[30] Foreign Application Priority Data

Mar. 16, 1989 [CH] Switzerland ............... 987/89

[51] Int. Cl.$^5$ ............................................ B23B 31/107
[52] U.S. Cl. ................................... 279/156; 279/105.1
[58] Field of Search ............. 279/1.5, 9 A, 105.1, 279/156

[56] References Cited

U.S. PATENT DOCUMENTS

| | | | |
|---|---|---|---|
| 3,202,433 | 8/1965 | Davis | 279/9 |
| 3,677,560 | 7/1972 | Clarkson | 279/1.5 X |
| 3,711,105 | 1/1973 | Johanson | 279/1 R |
| 3,719,367 | 3/1973 | Baturka | 279/1 A |
| 4,668,138 | 5/1987 | Carter | 409/234 |
| 4,815,347 | 3/1989 | Rogers | 82/153 |

FOREIGN PATENT DOCUMENTS 1904536 8/1970 Fed. Rep. of Germany ....... 279/1.5

Primary Examiner—Steven C. Bishop
Attorney, Agent, or Firm—Oblon, Spivak, McClelland, Maier & Neustadt

[57] ABSTRACT

A shank (4) of the chuck (1) has an axially located cylindrical opening (41) for holding a fixation lug (5) of a tool (6). A stop piece (11, 12, 13) provided with a rack-like tooth member (14) is axially movably mounted in a bore (10) which is also axially located. An adjustment shaft is inserted in a bore (15) located at a right angle to the chuck axis and provided with a second toothed member (17) which engages with the first toothed member (14) on the stop piece. This makes it possible to adjust the stop piece (11), one end (12) of which forms the stop for the fixation lug (5) of the tool (6), from the side of the chuck. The time-consuming repeated removal and insertion of the chuck from a presetting device, as occurs in prior art devices, can be eliminated.

4 Claims, 3 Drawing Sheets

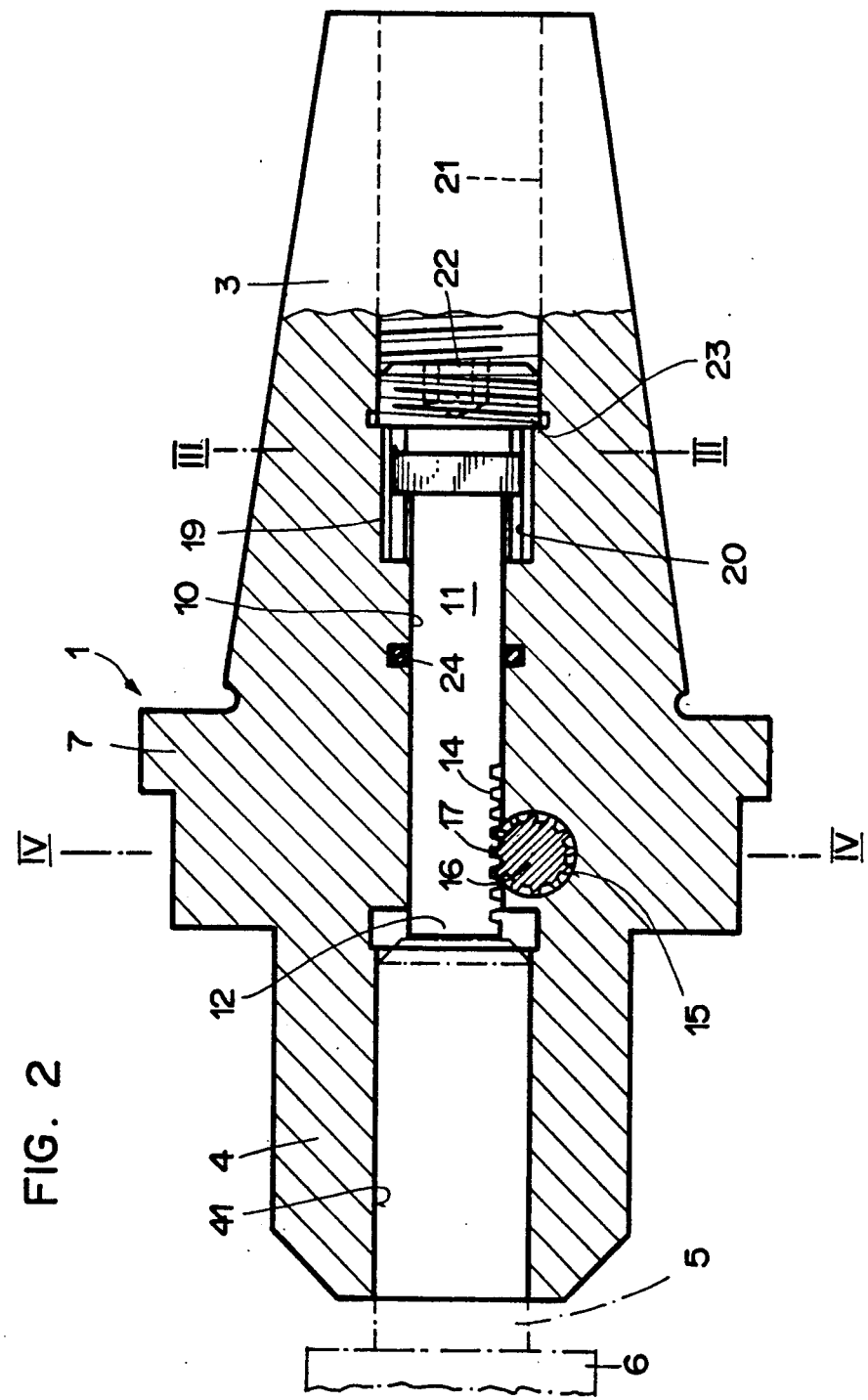

CHUCK

BACKGROUND OF THE INVENTION

1. Technical Field

The present invention relates to a chuck with a fixation part and a shank connected with this, with an axially located cylindrical opening to hold the fixation lug of a tool, with a stop piece to adjust the penetration depth of the fixation lug of the tool into the opening.

2. Background Art

In prior art chucks, e.g. according to DIN 1835, Form E, the penetration depth of a tool provided with a cylindrical fixation lug into an axially located cylindrical opening of the chuck is adjusted, to position the tool exactly, with a stop which protrudes into said opening from the rear and is adjustable via a thread. The positioning of the tool is usually carried out in a pre-setting device fitted with a ground glass disk. In order to adjust said stop, the chuck must each time be removed from the pre-setting device and inserted again, an action which must be repeated several times until the tool held by the chuck is in the required position.

DISCLOSURE OF INVENTION

It is an object of the present invention to eliminate these disadvantageous, time-consuming actions when positioning the tool in the chuck.

In a chuck as mentioned at the beginning, this is achieved according to the invention by means for adjusting the stop piece from the side of the chuck.

BRIEF DESCRIPTION OF THE DRAWINGS

An embodiment example of the invention and its application will be described in the following in more detail with reference to the accompanying drawing. The figures show:

FIG. 2 a sectional view taken along the line II—II of FIG. 1,

FIG. 3 is a sectional view taken along the line III—III of FIG. 2,

BEST MODE FOR CARRYING OUT THE INVENTION

Figure 1:
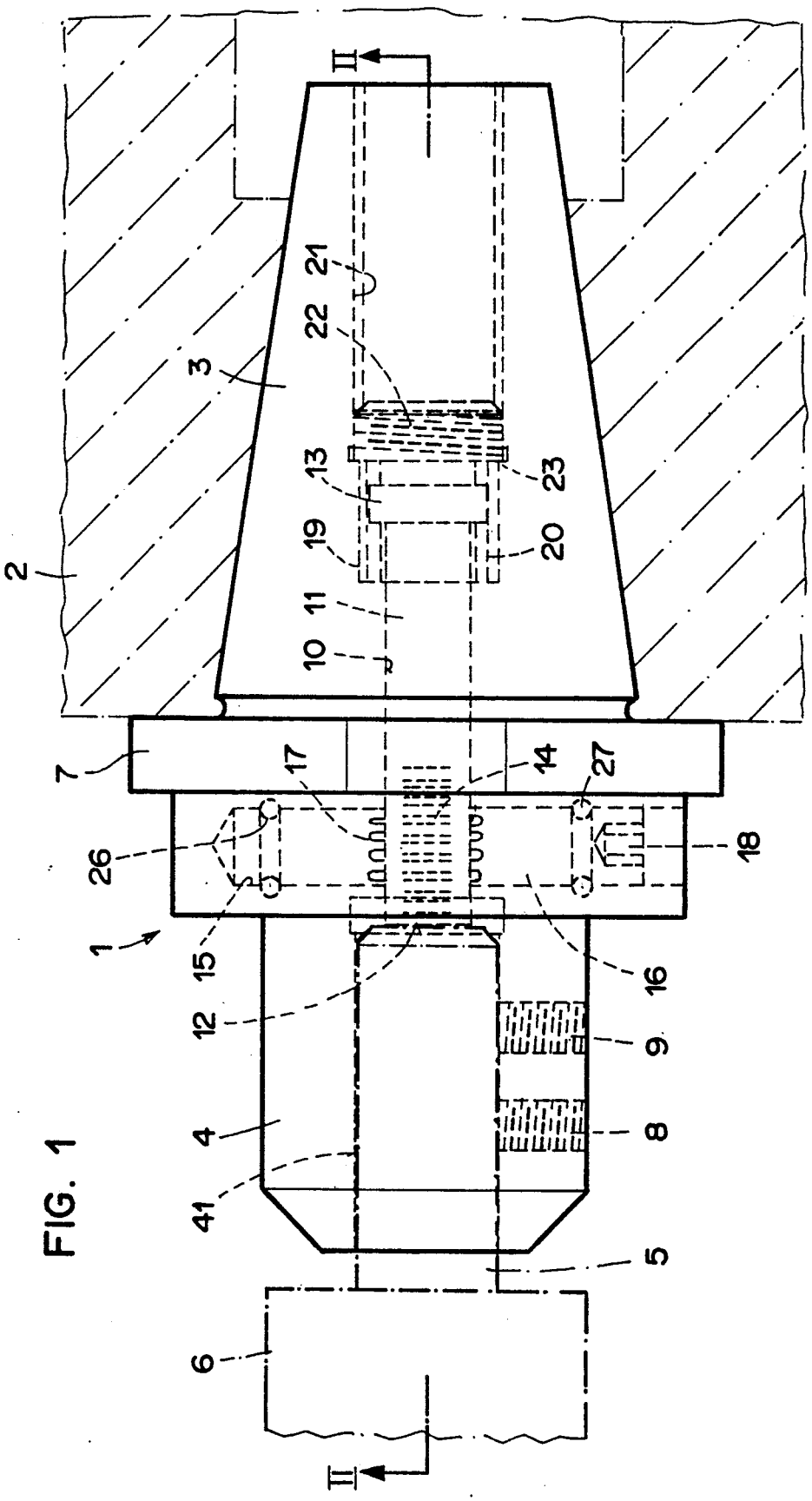
FIG. 1 a view of the chuck.

The chuck 1 for holding a tool is clamped in a holding spindle 2. The chuck substantially comprises a fixation cone 3 and a shank 4 with an opening 41 to hold the fixation lug 5 of a tool 6, and a middle part 7 lying between the fixation cone and shank 4. Two stop screws 8 and 9 are positioned in the shank 4 to stop the fixation lug 5 of the tool 6 in the shank 4. In an axial bore 10 of the chuck a cylinder shaped stop piece 11, with a front stop part 12, which protrudes into the opening 41 from the rear, and a back stop part 13, is movably located. In the area of the front stop part the cylinder shaped stop piece 11 is provided with a rack-like arranged toothed member 14. The front stop part 12 serves to position the tool exactly. An adjustment shaft 16 is mounted in a bore 16 located at right angles to the longitudinal axis of the chuck, the adjustment shaft having on its circumference a toothed member 17 which engages with the rack-like tooth member 14 of the stop piece 11. The adjustment shaft is provided at one end with a hexagonal inner bore 18 so that the adjustment shaft can be adjusted from the exterior with a wrench for socket head cap screws. A core bore 19 for the rear stop piece 13 is embossed with a square stamp, as indicated by the broken line 20. Furthermore, in the rear part of the fixation cone 3, is located a bore 21 provided with a thread which serves to screw in an end stop 22, with which the rearward position of the cylinder shaped stop piece 11 can be limited, so that the two toothed member 14 and 17 cannot come together unless engaged. The end stop 22 can be screwed into the fixation cone 3 from the rear and reaches the stop at a surface 23.

FIG. 2 shows a section along line II—II of FIG. 1. This FIG. also shows the sealing ring 24 which seals the stop piece, necessary when a cooling agent is used.

FIG. 3 is a section along line III—III of FIG. 2. It shows the rear stop part 13 which is inserted so that it cannot turn in the core bore 19 which is embossed with a square stamp, so that the two toothed members 17 and 14 are always engaged with each other.

Figure 4:
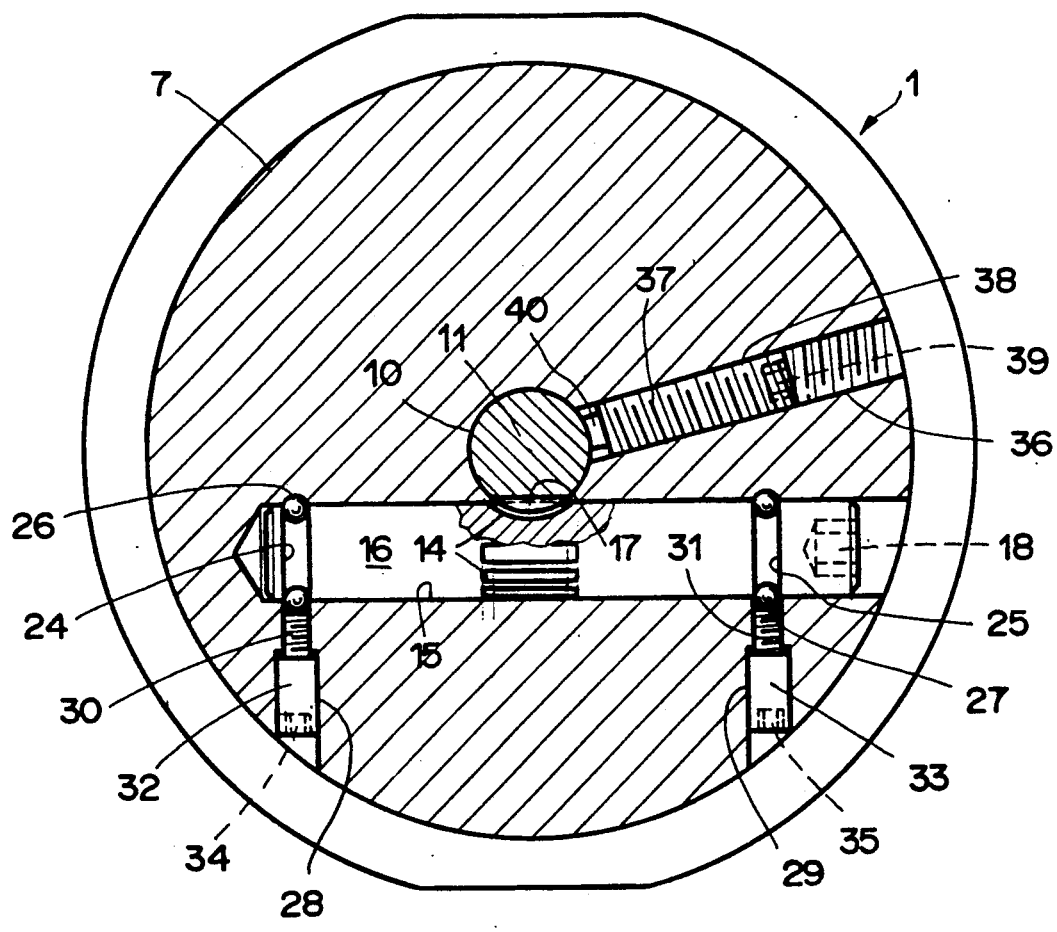
FIG. 4 is a sectional view taken along the line IV—IV of FIG. 2.

FIG. 4 shows a cross-section taken along line IV—IV of FIG. 2. As shown in this FIG., The adjustment shaft 16 is mounted in two ball bearings 24 and 25 with balls 26 and 27. The balls 26 and 27 are introduced via openings 28 and 29. These openings 28 and 29 are sealed with plugs 32 and 33 provided with threads 30 and 31, the plugs also being each provided with a hexagonal inner bore 34 and 35 to screw in the plugs with a wrench for socket head cap screws. Furthermore, a bore 36 which also lies along the line of the section of FIG. 4, running vertical to the longitudinal axis of the chuck and at an incline to the adjustment shaft 16 is foreseen, into which can be screwed a pin 38 provided with a thread 37. At its end turned away from the longitudinal axis of the chuck this pin 38 is provided with an inner bore 39, so that it can be turned with a wrench for socket head cap screws. At its end turned towards the stop piece 11, the pin 38 is provided with a stop 40 with which the stop piece can be stopped in the adjusted position.

I claim:

1. A chuck, which comprises
   a fixation part;
   a shaft connected with said fixation part wherein an axial cylindrical opening is formed in said shaft for holding a fixation lug of a tool;
   a stop piece positioned in said shaft for adjusting penetration depth of the fixation lug of the tool into the cylindrical opening;
   means connected to said shaft for axially adjusting said stop piece from a side portion of said shaft, said means including an adjustment shaft running at a right angle to the longitudinal axis of the chuck, said stop piece including a first toothed member located on a side portion thereof and the adjustment shaft including a second toothed member located on the circumference thereof for engaging said first toothed member.

2. A chuck according to claim 1, which comprises an element mounted in said shaft for stopping the stop piece.

3. A chuck according to claim 2, wherein the element comprises a pin movably mounted in a bore formed in said shaft which engages said stop piece.

4. A chuck according to claim 1, which comprises an end stop screwed into an axial bore of the fixation part for limiting the rearward positioning of the stop piece.

* * * * *